(12) United States Patent
Karaoguz et al.

(10) Patent No.: US 8,625,662 B2
(45) Date of Patent: Jan. 7, 2014

(54) MODIFICATION OF DELIVERY OF VIDEO STREAM TO WIRELESS DEVICE BASED UPON POSITION/MOTION OF WIRELESS DEVICE

(75) Inventors: Jeyhan Karaoguz, Irvine, CA (US); Sherman (Xuemin) Chen, San Diego, CA (US); Michael Dove, Los Gatos, CA (US); Thomas J. Quigley, Franklin, NC (US); David Rosmann, Irvine, CA (US); Stephen E. Gordon, Lexington, MA (US)

(73) Assignee: Broadcom Corporation, Irvine, CA (US)

( * ) Notice: Subject to any disclaimer, the term of this patent is extended or adjusted under 35 U.S.C. 154(b) by 1271 days.

(21) Appl. No.: 12/189,389

(22) Filed: Aug. 11, 2008

(65) Prior Publication Data
US 2009/0296827 A1    Dec. 3, 2009

Related U.S. Application Data

(60) Provisional application No. 61/056,603, filed on May 28, 2008.

(51) Int. Cl.
*H04N 11/02* (2006.01)

(52) U.S. Cl.
USPC .......................................... 375/240

(58) Field of Classification Search
USPC .................................... 375/240.26
See application file for complete search history.

(56) References Cited

U.S. PATENT DOCUMENTS

| 6,850,764 | B1 * | 2/2005 | Patel .............................. 455/450 |
| 7,542,422 | B2 * | 6/2009 | Joyce et al. .................... 370/235 |
| 2002/0064177 | A1 * | 5/2002 | Bertram et al. ................ 370/458 |
| 2004/0017310 | A1 * | 1/2004 | Vargas-Hurlston et al. .......................... 342/357.1 |
| 2004/0213475 | A1 * | 10/2004 | Grohs ........................... 382/243 |
| 2006/0019679 | A1 * | 1/2006 | Rappaport et al. ......... 455/456.5 |
| 2008/0137541 | A1 * | 6/2008 | Agarwal et al. ............... 370/241 |

* cited by examiner

*Primary Examiner* — Mark Rinehart
*Assistant Examiner* — Maharishi Khirodhar
(74) *Attorney, Agent, or Firm* — Garlick & Markison

(57) ABSTRACT

Processing video data for delivery to a remote wireless device includes receiving video data from a video source and receiving position and motion information regarding the remote wireless device. Operation also includes, based upon the position and motion information regarding the remote wireless device, determining an anticipated Quality of Service (QoS) available for servicing of transmissions to the remote wireless device and determining video processing parameters based upon the video data and the anticipated QoS. Operation further includes processing the video data based upon the video processing parameters to produce an output video stream and transmitting the output video stream for delivery to the remote wireless device. Operation may also/alternatively include altering wireless transmission parameters of a transport stream servicing delivery of the video data to alter the anticipated QoS.

20 Claims, 13 Drawing Sheets

MODIFICATION OF DELIVERY OF VIDEO STREAM TO WIRELESS DEVICE BASED UPON POSITION/MOTION OF WIRELESS DEVICE

CROSS-REFERENCE TO RELATED APPLICATION

The present application claims priority under 35 U.S.C. 119(e) to Provisional Patent Application Ser. No. 61/056,603, filed May 28, 2008, which is incorporated herein by reference in its entirety.

The present application is related to U.S. Patent Application entitled "EDGE DEVICE RECEPTION VERIFICATION/NON-RECEPTION VERIFICATION LINKS TO DIFFERING DEVICES, having application Ser. No. 12/172,130, filed Jul. 11, 2008.

BACKGROUND

1. Technical Field of the Invention

This invention relates generally to video/audio content transport, and more particularly to the preparation, transportation, and receipt of such video/audio content.

2. Related Art

The broadcast of digitized video/audio information (multimedia content) is well known. Limited access communication networks such as cable television systems, satellite television systems, and direct broadcast television systems support delivery of digitized multimedia content via controlled transport medium. In the case of a cable modem system, a dedicated network that includes cable modem plant is carefully controlled by the cable system provider to ensure that the multimedia content is robustly delivered to subscribers' receivers. Likewise, with satellite television systems, dedicated wireless spectrum robustly carries the multi-media content to subscribers' receivers. Further, in direct broadcast television systems such as High Definition (HD) broadcast systems, dedicated wireless spectrum robustly delivers the multi-media content from a transmitting tower to receiving devices. Robust delivery, resulting in timely receipt of the multimedia content by a receiving device is critical for the quality of delivered video and audio.

Some of these limited access communication networks now support on-demand programming in which multimedia content is directed to one, or a relatively few number of receiving devices. The number of on-demand programs that can be serviced by each of these types of systems depends upon, among other things, the availability of data throughput between a multimedia source device and the one or more receiving devices. Generally, this on-demand programming is initiated by one or more subscribers and serviced only upon initiation.

Publicly accessible communication networks, e.g., Local Area Networks (LANs), Wireless Local Area Networks (WLANs), Wide Area Networks (WANs), Wireless Wide Area Networks (WWANs), and cellular telephone networks, have evolved to the point where they now are capable of providing data rates sufficient to service streamed multimedia content. The format of the streamed multimedia content is similar/same as that that is serviced by the limited access networks, e.g., cable networks, satellite networks. However, each of these communication networks is shared by many users that compete for available data throughput. Resultantly, streamed multimedia content is typically not given preferential treatment by these networks.

Generally, streamed multimedia content is formed/created by a first electronic device, e.g., web server, personal computer, user equipment, etc., transmitted across one or more communication networks, and received and processed by a second electronic device, e.g., personal computer, laptop computer, cellular telephone, WLAN device, or WWAN device. In creating the multimedia content, the first electronic device obtains/retrieves multimedia content from a video camera or from a storage device, for example, and encodes the multimedia content to create encoded audio and video frames according to a standard format, e.g., Quicktime, (motion picture expert group) MPEG-2, MPEG-4, or H.264, for example. The encoded audio and video frames are placed into data packets that are sequentially transmitted from the first electronic device onto a servicing communication network, the data packets addressed to one or more second electronic device(s). The sequentially transmitted sequence of encoded audio/video frames may be referred to as a video stream or an audio/video stream. One or more communication networks carry the data packets to the second electronic device. The second electronic device receives the data packets, reorders the data packets if required, and extracts the encoded audio and video frames from the data packets. A decoder of the second electronic device decodes the encoded audio and/or video frames to produce audio and video data. The second electronic device then stores the video/audio data and/or presents the video/audio data to a user via a user interface.

The audio/video stream may be carried by one or more of a number of differing types of communication networks, e.g., LANs, WANs, the Internet, WWANs, WLANs, cellular networks, etc. Some of these networks may not support the audio/video stream reliability and/or with sufficient data rate, resulting in poor quality audio/video at the second electronic device. Thus, a need exists for structures and operations for the formation, transmission, and receipt of audio/video streams across such networks. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

The present invention is directed to apparatus and methods of operation that are further described in the following Brief Description of the Drawings, the Detailed Description of the Drawings, and the claims. Other features and advantages of the present invention will become apparent from the following detailed description of the invention made with reference to the accompanying drawings.

DETAILED DESCRIPTION OF THE DRAWINGS

Figure 1:
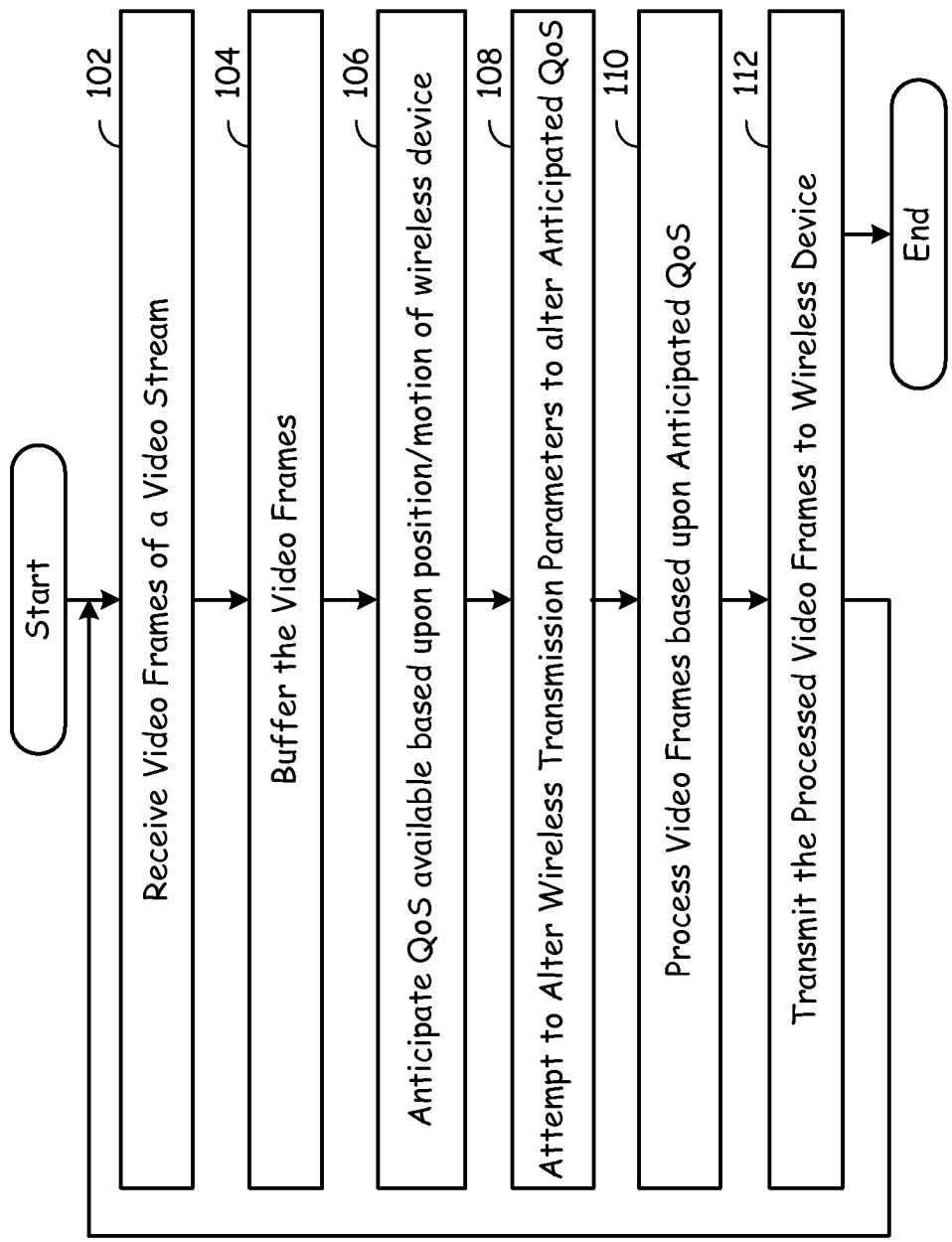
FIG. 1 is a flow chart illustrating operations for video stream processing/wireless link alteration based upon location/motion of a destination wireless device according to one or more embodiments of the present invention.

FIG. 1 is a flow chart illustrating operations for video stream processing/wireless link alteration based upon location/motion of a destination wireless device according to one or more embodiments of the present invention. The operations 100 of FIG. 1 commence with a video processing system receiving video frames of a video stream (Step 102). The video stream may also be referred to as video data without departing from the present invention with the video data or video stream received from a video source. Operations 100 continue with the video processing system buffering the video frames of the video stream (Step 104). Buffering the video frames may be done in system memory or in a dedicated video frame buffer of the video processing system.

Operation continues with the video processing system anticipating a Quality of Service (QoS) available for video stream delivery based upon position and/or motion information regarding a remote wireless device to which the video stream is to be delivered (Step 106). While reference is made herein to position/motion information, such reference may mean only position information in some embodiments, only motion information in other embodiments, and both position and motion information in still other embodiments. Based upon the anticipated QoS available that was determined based upon the position/motion information regarding the remote wireless device, the video processing system may perform one or both of Steps 108 and 110. With the operation of Step 108, the video processing system attempts to alter wireless transmission parameters used to service the wireless device because the anticipated QoS is insufficient to service transport of the video stream. Thus, with the operation of Step 108, the video processing system, knowing that the anticipated QoS determined at Step 106 is insufficient to service the transported video streams to the remote wireless device, attempts to obtain a differing QoS by altering the wireless transmission parameters.

According to a different or additional operation of the operations 100 of FIG. 1, the video processing system processes the video frames based upon the anticipated QoS as determined at Step 106 in order to cause a throughput of the video stream to correspond to the anticipated QoS (Step 110). Because the anticipated QoS of a servicing wireless network may change over time based upon then current position/motion of the wireless device, the anticipated QoS may be insufficient to service transport of video streams from the video processing system to the remote wireless device at any point in time. In such case, the video processing system processes the video frames of the video stream/video data based upon determined video processing parameters to produce an output video stream that meets the anticipated QoS. According to the anticipated result of the operations of Step 110, the servicing transport stream supported by the servicing wireless network will be sufficient to transport an output video stream to the remote wireless device. Finally, the video processing system transmits the output video stream to the remote wireless device (Step 112). Various embodiments of the operations 100 of FIG. 1 will be described in more detail with reference to FIGS. 6-9 herein. Structures employed to service the operations 100 of FIG. 1 will be described further herein with reference to FIGS. 3-5.

Figure 2:
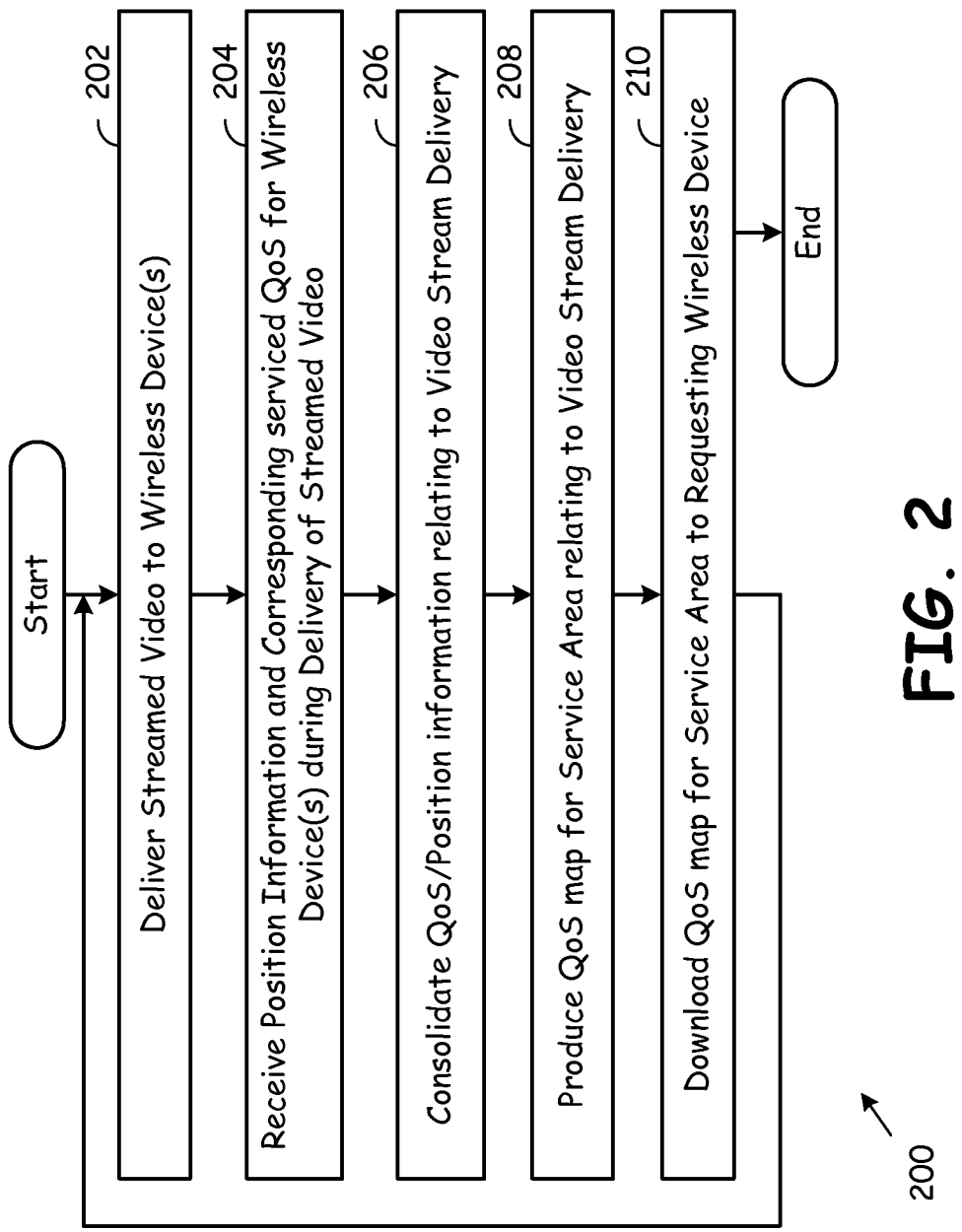
FIG. 2 is a flow chart illustrating operations for wireless video stream delivery Quality of Service (QoS) map generation and delivery according to one or more embodiments of the present invention.

FIG. 2 is a flow chart illustrating operations for wireless video stream delivery QoS map generation and delivery according to one or more embodiments of the present invention. The operations 200 of FIG. 2 commence with the delivery of streamed video to one or more serviced wireless devices (Step 202). The operations of Step 202 may include the delivery of differing streamed video to a plurality of wireless devices within a common serviced area, the delivery of a common video stream to multiple wireless devices, or a combination thereof. Operations 200 continue with, for each of a plurality of serviced wireless devices, receiving position/motion information and corresponding serviced QoS for the respective wireless devices during delivery of the streamed video (Step 204). The operations 200 of FIG. 2 are performed for a plurality of serviced wireless devices during delivery of streamed video to the wireless devices. Thus, during the delivery of the streamed video to the wireless devices at Step 204, the video processing system or another device may request and receive position information and corresponding serviced QoS for each of the plurality of wireless devices during the delivery of the streamed video. Alternately, the wireless devices upload their position/motion information without being queried. The position/motion information in one embodiment will be Global Positioning System (GPS) information captured by each of the wireless devices and returned with respective QoS determined by the wireless devices. The QoS information may be determined by the wireless devices or by another component(s) within the transport path or another component(s) monitoring the video stream delivery.

Operations 200 continue with the video processing system consolidating the QoS and position/motion information collected during video stream delivery (Step 206). The consolidation of the collected information will be performed for all or a subset of the collected QoS/position/motion information captured over a period of time that is considered to be representative of the operations of the respective wireless network within the particular service area. Then, operations 200 include producing a QoS map for the service area that relates directly to video stream delivery (Step 208). As is generally known, video stream delivery has its own unique transport requirement. The transport of video stream requires fairly large bandwidth as compared to other types of data delivered in a wireless network and such bandwidth must be generally continuously available in order to meet the delivery requirements for the transported video stream. For example, as compared to a bulk data delivery to a wireless device, the video stream delivery must have regular access to a transport path to a remote wireless device in order to avoid starvation of a decoder buffer of the wireless device. Further, delivery of video frames of the video stream must be serviced with a fairly uniform Round Trip Delay (RTD) and with fairly low jitter. Consistent RTD allows the video processing system to minimize buffer starvation risk. By delivering the video frame to the video stream with a fairly low jitter, a decoder of the remote wireless device is able to reconstruct a system clock regarding the video stream such that the video stream may be presented to a user with acceptable quality. When the jitter is large, the decoder clock of the wireless device may be unable to adequately reconstruct a system clock resulting in poor video quality and/or decoder buffer starvation or overflow.

Finally, after the QoS map is generated for the respective service area, the video processing system downloads the QoS map for the service area to a requesting wireless device (Step 210). The characteristics of a QoS map regarding video stream delivery will be described further herein with reference to FIG. 12. An example of the collection of QoS information and respective position and motion information will be described further herein with reference to FIG. 11. Use of the QoS map by the requesting wireless device will be described further with reference to FIG. 13.

The operations 200 of FIG. 2 are be repeated over time such that an accurate QoS map for any particular time period is captured and may be downloaded to a requesting wireless device. A user of the requesting wireless device may use the downloaded QoS map in order to alter position and/or motion of the wireless device. For example, if a user of the wireless device is attempting to establish a video conference, the user may determine that acceptable QoS is not available at a current location. In such case, the user of the wireless device may travel to a differing location with a higher QoS available to service the video conference. Further, the QoS map may indicate that a higher QoS for servicing the video conference will be available if the user reduces a rate of motion of the wireless device. In such case, the user of the wireless device may use the QoS map and information contained therein by reducing mobility of the wireless device and achieving an acceptable QoS to service the video conference. As the reader will appreciate, a user of the wireless device may use the QoS map for other purposes as well. For example, the user may use the QoS map in order to determine whether or not to initiate a video streaming operation at all. Further, the user may determine that a cost associated with the video stream delivery based upon the QoS map (cost information may be included with QoS map) is not warranted due to a poor available QoS at a current location/mobility of the wireless device.

Figure 3:
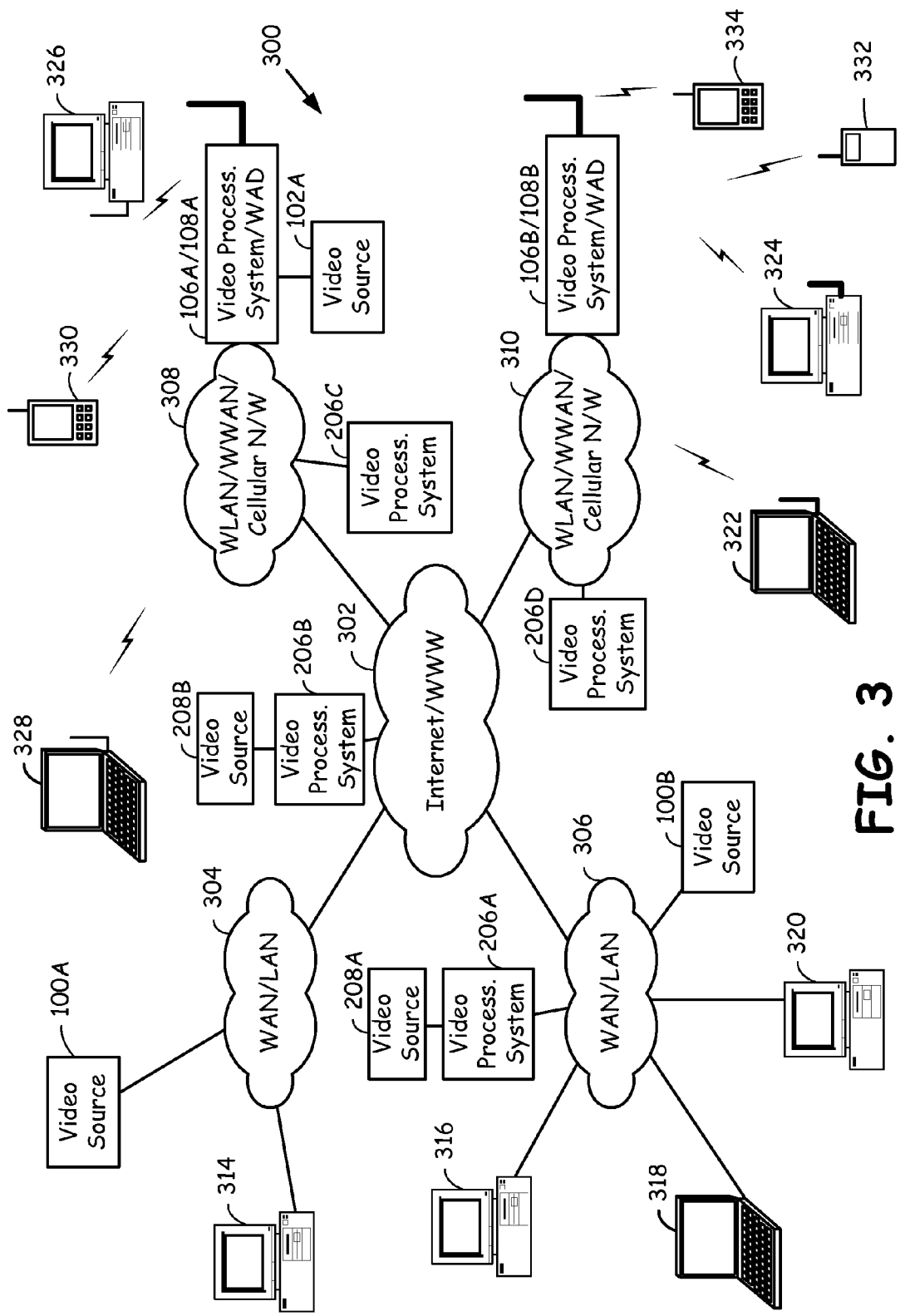
FIG. 3 is a system diagram illustrating a communication system that operates according to one or more embodiment of the present invention.

FIG. 3 is a system diagram illustrating a communication system that operates according to one or more embodiment of the present invention. The system 300 of FIG. 3 includes a plurality of communication networks 302, 304, 306, 308, and 310 that service a plurality of electronic devices 314, 316, 318, 320, 322, 324, 326, 328, 330, 332, and 334. These communication networks include the Internet/World Wide Web (WWW) 302, one or more Wide Area Networks/Local Area Networks (WANs/LANs) 304 and 306, and one or more Wireless Wide Area Networks/Wireless Local Area Networks/Cellular networks (WLANs/WWANs/Cellular networks) 308 and 310. The Internet/WWW 302 is generally known and supports Internet Protocol (IP) operations. The WANs/LANs 304 and 306 support electronic devices 314, 316, 318, and 320 and support IP operations. The WLANs/WWANs/Cellular networks 308 and 310 support wireless devices 322, 324, 326, 328, 330, 332, and 334.

The WLAN/WWAN/Cellular networks 308 and 310 operate according to one or more wireless interface standards, e.g., IEEE 802.11x, WiMAX, GSM, EDGE, GPRS, WCDMA, CDMA, 1xEV-DO, 1xEV-DV, etc. The WLAN/WWAN/Cellular networks 308 and 310 include a back-haul network that couples to the Internet/WWW 302 and service wireless links for wireless devices 322, 324, 326, 328, 330, 332, and 334. In providing this wireless service, the WLAN/WWAN/Cellular networks 308 and 310 include infrastructure devices, e.g., Access Points and base stations to wirelessly service the electronic devices 322, 324, 326, 328, 330, 332, and 334. The wireless links serviced by the WLAN/WWAN/Cellular networks 308 and 310 are shared amongst the wireless devices 324-334 and are generally data throughput limited. Such data throughput limitations result because the wireless links are shared, the wireless links are degraded by operating conditions, and/or simply because the wireless links have basic data throughput limitations. According to some aspects of embodiments of the present invention, wireless transmission parameters of the wireless links are altered so that sufficient QoS is established to support video streaming operation.

According to operations of the system 300 of FIG. 3, any of the devices 314, 316, 318, or 320, any of the video sources 100A, 100B, 102A, 208A, and/or 208B, and/or any of the video processing systems 106A, 106B, 206A, 206B, 206C, or 206D may operate as a video processing system according to the operations described with reference to FIGS. 1 and 2 and as will be further described with reference to FIGS. 5-12. Further each of the wireless devices 322, 324, 326, 328, 330, 332, of 334 may serve and operate as a remote wireless device as was described with reference to FIGS. 1 and 2 and as will be further described with reference to FIGS. 4 and 6-12. Note that with the embodiments of FIG. 3, video processing system 106A and wireless access device 108A are shown as a single block and video processing system 106B and wireless access device 108B are shown as a single block. This indicated structure does not necessarily indicate that these devices share a physical structure, only that they are coupled functionally at the edge of networks 308 and 310, respectively.

Figure 4:
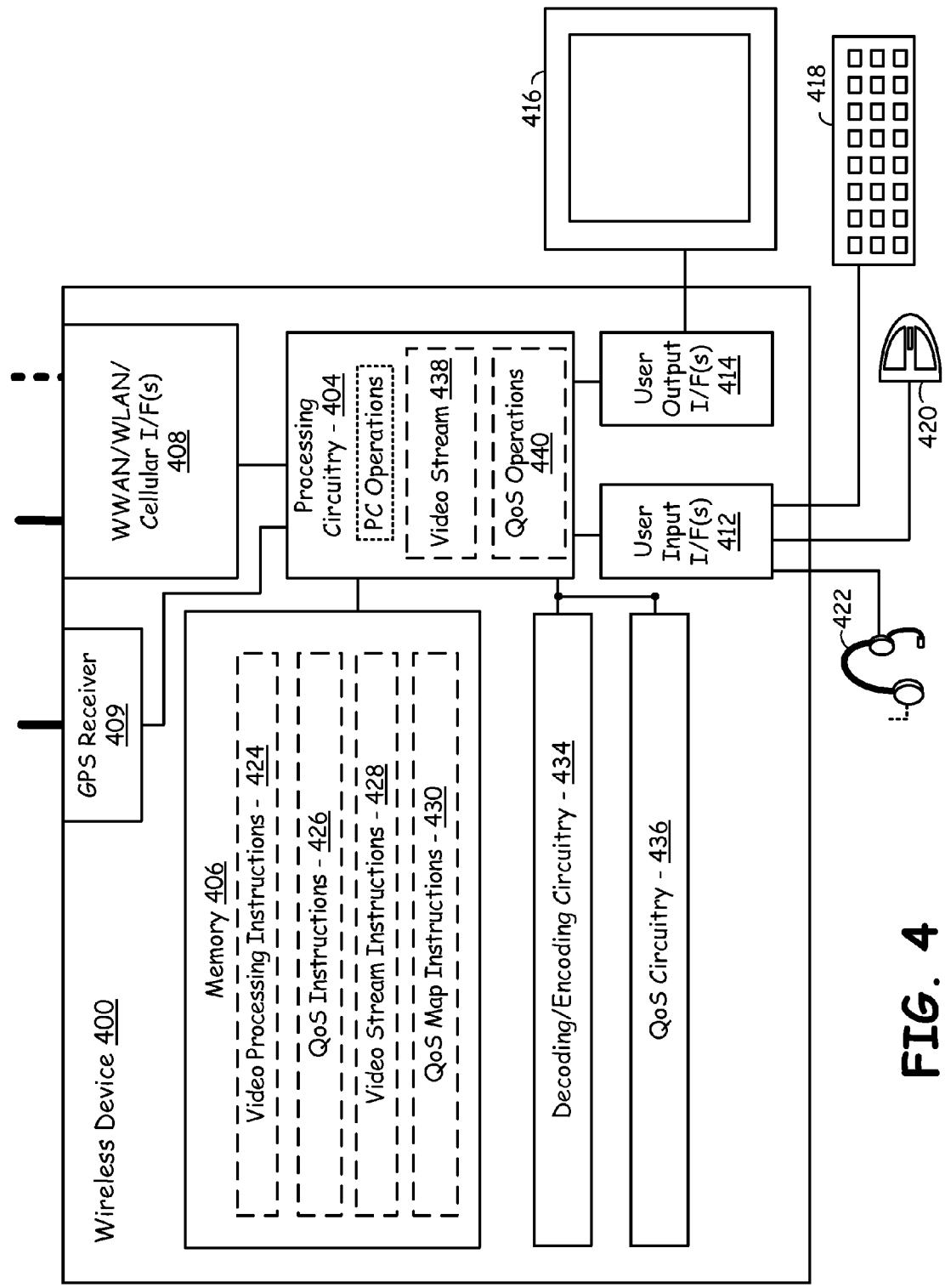
FIG. 4 is a block diagram illustrating a wireless device constructed and operating according to one or more embodiments of the present invention.

FIG. 4 is a block diagram illustrating a wireless device constructed and operating according to one or more embodiments of the present invention. The wireless device 400 is representative of an embodiment of one or more of the wireless devices 322, 324, 326, 328, 330, 332, of 334 of FIG. 3, for example. The components of wireless device 400 are generically illustrated. Particular embodiments of the wireless device 400 of FIG. 4 may include some, most, or all of the components that are illustrated in FIG. 4.

Generally, the wireless device 400 includes processing circuitry 404, memory 406, wireless network interface 408, Global Positioning System (GPS) receiver 409, user input interfaces 412, and user output interfaces 414. The user input interfaces 412 couple to headset 422, mouse 420, and keyboard 418. The user output interfaces 414 couple to audio/video display device 416. The user output interface 414 may also couple to headphone 422. The display device 416 may include a monitor, projector, speakers, and other components that are used to present the audio and video output to a user. While these components of the wireless device are shown to be physically separate, all of these components could be housed in a single enclosure, such as that of a handheld device. The wireless device 400 embodies the structure and performs operations of the present invention with respect to area of interest processing. Thus, the wireless device 400 operates consistently with the operations and structures previously described with reference to FIGS. 1-3 and as will be described further with reference to FIGS. 6-9.

In one particular construct of the wireless device 400, dedicated hardware is employed for video processing operations and QoS operations. In such case, the wireless device 400 includes decoding/encoding circuitry 434 and QoS circuitry 436. Alternatively, or additionally, the wireless device 400 services video stream operations and QoS operations using non-dedicated resources. In such case, these operations of wireless device 400 are serviced by processing circuitry 404. The processing circuitry 404 performs, in addition to its PC operations, video stream operations 438, and QoS operations 440. In such case, particular hardware may be included in the processing circuitry 404 to perform the operations 438 and 440. Alternatively, video stream operations 438 and QoS operations 440 are performed by the execution of software instructions using generalized hardware (or a combination of generalized hardware and dedicated hardware). In this case, the processing circuitry 404 retrieves video processing instructions 424, QoS instructions 426, area of interest video stream instructions 428, and/or QoS Map instructions 430 from memory 406. The processing circuitry 404 executes these various instructions 424, 426, 428, and/or 430 to perform the indicated functions. Execution of these instructions 424, 426, 428, and/or 430 causes the wireless device 400 to interface with the video processing system to perform operations described with reference to FIGS. 1-3 and 6-12. Processing circuitry 404 may include one or more processing devices such as microprocessors, digital signal processors, application specific processors, or other processing type devices. Memory 406 may be any type of digital memory, volatile, or non-volatile, capable of storing digital information such as RAM, ROM, hard disk drive, Flash RAM, Flash ROM, optical drive, or other type of digital memory.

Generally, the wireless device 400 receives a video stream (video/audio stream) that is carried by data packets via the network interface 408 and processes the received video stream. Further, the wireless device 400, in some operations, provides QoS and position/motion information to a video processing system via interaction therewith. Position and motion information is obtained via access of the GPS receiver 409. In still other operations, the wireless device 400 may output a video stream within data packets via network interface 408 to another device. The network interface 408 supports one or more of WWAN, WLAN, and cellular wireless communications. Thus, the wireless interface 408, in cooperation with the processing circuitry 404 and memory supports the standardized communication protocol operations in most embodiments that have been previously described herein.

Figure 5:
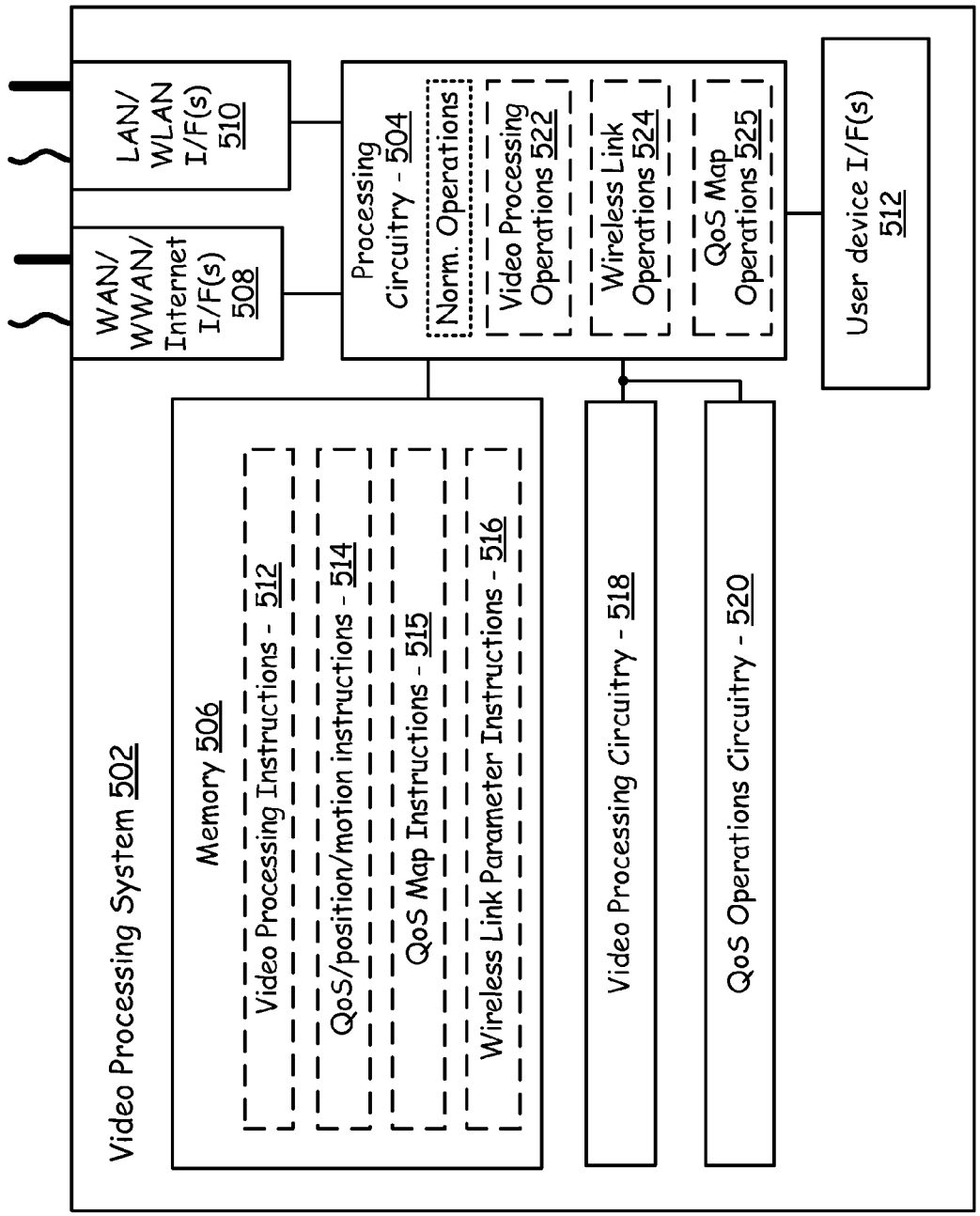
FIG. 5 is a block diagram illustrating a video processing system constructed and operating according to at least one embodiment of the present invention.

FIG. 5 is a block diagram illustrating a video processing system constructed and operating according to at least one embodiment of the present invention. The video processing system 502 may correspond to one of devices 314, 316, 318, or 320, video sources 100A, 100B, 102A, 208A, and/or 208B, and/or any of the video processing systems 106A, 106B, 206A, 206B, 206C, or 206D of FIG. 3. The video processing system 502 performs the video processing system operations previously described with reference to FIGS. 1-3 and that will be further described herein with reference to FIGS. 6-12. The video processing system 502 includes processing circuitry 504, memory 506, network interfaces 508 and 510, user device interfaces 512, and may include video processing circuitry 518 and QoS Operations Circuitry 520. The processing circuitry 504 may include one or more processing devices such as microprocessors, digital signal processors, application specific processors, or other processing type devices. Memory 506 may be any type of digital memory, volatile, or non-volatile, capable of storing digital information such as RAM, ROM, hard disk drive, Flash RAM, Flash ROM, optical drive, or other type of digital memory. The first network interface 508 supports WAN/WWAN/Internet interface operations while the second network interface 510 supports LAN and WLAN interface operations. Of course, in differing embodiments a single network interface may service all necessary communication interface operations and in still other embodiments, additional network interfaces may be employed.

To accomplish its operations, the video processing system 502 may employ specialized circuitry, i.e., the video processing circuitry 518 and the QoS operations 520. The operations of the video processing system 502 may also/otherwise be implemented by the processing circuitry 504. In such case, the processing circuitry 504, in addition to its normal operations, may perform video processing operations 522, wireless link operations 524, and QoS Map operations 525. In its operations, the processing circuitry 504 retrieves software instructions from memory and executes these software instructions, which include video processing instructions 512, QoS/position/motion instructions 514, QoS Map operations 515, and wireless link parameter instructions 516.

Figure 6:
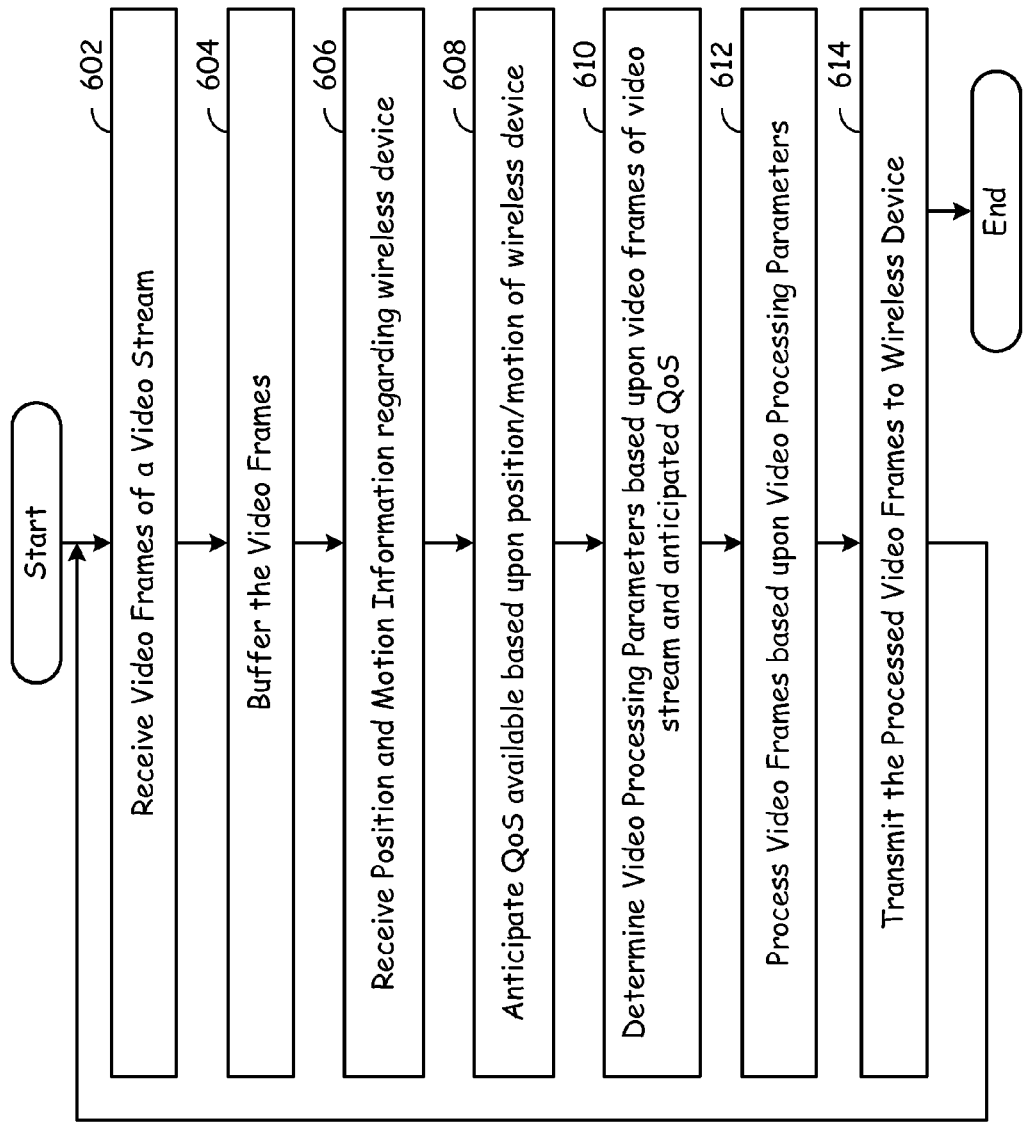
FIG. 6 is a flow chart illustrating operations for video stream processing based upon location/motion of a destination wireless device according to one or more embodiments of the present invention.

FIG. 6 is a flow chart illustrating operations for video stream processing based upon location/motion of a destination wireless device according to one or more embodiments of the present invention. The operations 600 of FIG. 6 commence with the video processing system receiving video frames of a video stream from a video source (Step 602). The video processing system then buffers the video frames for future use (Step 604). The video processing system then receives position/motion information regarding a remote wireless device (Step 606). Then, based upon the position/motion information regarding the remote wireless device, the video processing system anticipates a QoS available for servicing transport of the video stream to the wireless device (Step 608). Then, based upon the characteristics of the video stream itself and of the anticipated QoS available for servicing of the video stream, the video processing system determines video processing parameters that may be used to process the video stream (Step 610). The video processing system then processes the video frames based upon the video processing parameters to produce an output video stream that differs from the received video stream (Step 612).

Generally, the processing performed at Step 612 upon the video stream reduces bandwidth required to transport the video stream from the video processing system to the remote wireless device. Thus, the anticipated QoS available for servicing the video stream for transporting the video stream to the remote wireless device will be sufficient to service transport of the output video stream. Finally, the video processing system transmits the video processed video frames of the output video stream to the remote wireless device (Step 614). The reader should appreciate the transport or transmission of the processed video frames of the video stream to the wireless device at Step 614 may be serviced by only a wireless link as is described with reference to FIG. 3 between video processing device 106 and wireless device 330, for example. Alternatively, transport or transmission of the output video stream to the remote wireless device may be made from video processing device 206A to wireless device 334, for example. In such case, the output video stream is transported via WAN/LAN 306, Internet/WWW 320, WLAN/WWAN/cellular network 310, and via wireless access device 108. In such case, the transport path may be bandwidth limited by the wireless link between wireless access device 108 and wireless device 334. Alternatively, bandwidth may be limited via other components along the transport path from video processing system 206A to wireless device 334.

In anticipating the QoS available based upon position and motion information of the wireless device at Step 608, the operations 600 of FIG. 6 may include determining a QoS currently available for servicing and transmission to the remote wireless device based upon current position and motion information of the wireless device. Alternatively, the video processing system may anticipate QoS available based upon a predicted future location of the remote wireless device and historical QoS location information. Thus, the operations 608 of FIG. 6 may consider not only the current position of the wireless device but also where the wireless device is anticipated to be over duration of receipt of the video stream. Thus, in such case, the operations 600 of FIG. 6 consider that the anticipated QoS will change over time with changing positions of the wireless device.

Figure 7:
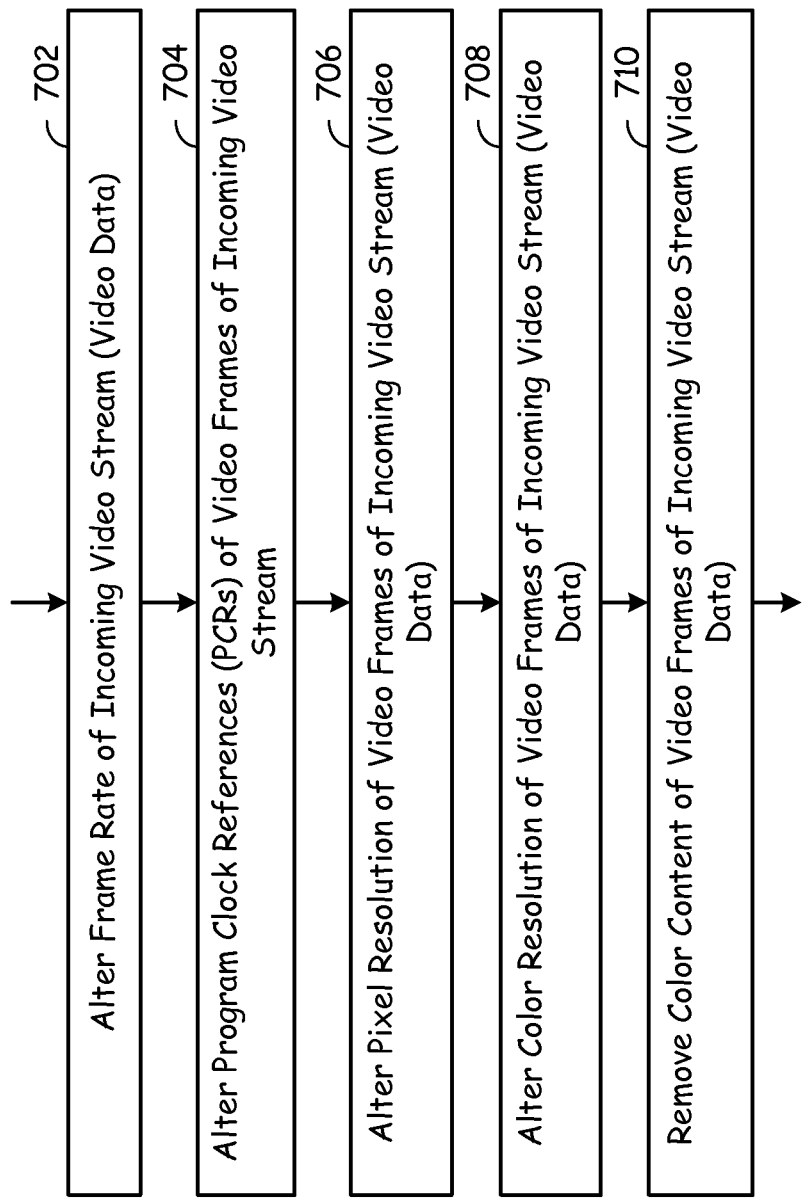
FIG. 7 is a flow chart illustrating operations for altering a video stream according to one or more embodiments of the present invention.

FIG. 7 is a flow chart illustrating operations for altering a video stream according to one or more embodiments of the present invention. Referring now to FIG. 7, the operations of 612 are further described. The operations 612 of FIG. 7 include a number of particular processing operations. These processing operations may be individually, partially, or fully employed in processing of the incoming video data to produce the outgoing video stream that is subsequently transferred to the remote wireless device. Some or all these operations 612 may be performed at any given time. Further, in some operations, none of these video processing operations of FIG. 7 are required because the edge device simply passes an incoming video stream as an outgoing video stream for delivery to the remote wireless device.

The operations 612 of FIG. 7 may include altering a frame rate of an incoming video stream (video data) to produce an outgoing video stream (Step 702). Generally, when the frame rate of the incoming video stream is altered to produce the outgoing video stream, PCRs may/should be required to be altered based upon the alteration of frame rate of the incoming video stream (Step 702). Operation 612 of FIG. 7 may also/alternatively include altering a pixel resolution of video frames of the incoming video stream (video data) to produce the output video stream (Step 706). In altering the pixel resolution of the video frames of the incoming video stream, the edge device may simply reduce the number of pixels of video frames of the video stream by combining pixel data. For example, if an incoming video stream has a pixel resolution of 700×600, the operation of Step 706 may include altering the pixel resolutions from 700×600 to 400×300, for example. Of course, altering pixel resolution of the video frames may include moving from one standard pixel resolution to another standard pixel resolution, the second pixel resolution having lesser resolution than the first.

The operation 612 of FIG. 7 may further include altering a color resolution of video frames of the incoming video stream to produce the output video streams (Step 708). The operations of FIG. 7 may also include removing color content of video frames of the incoming video stream to produce the output video stream (Step 710). By reducing the color resolution of the video frames or removing color from the video frames to produce black and white video frames, the data size of the output video stream as compared to the incoming video stream is reduced. Generally, processing of the video stream may be required in order to cause the output video stream to comply with a data throughput support provided by the servicing wireless network (supported QoS).

Figure 8:
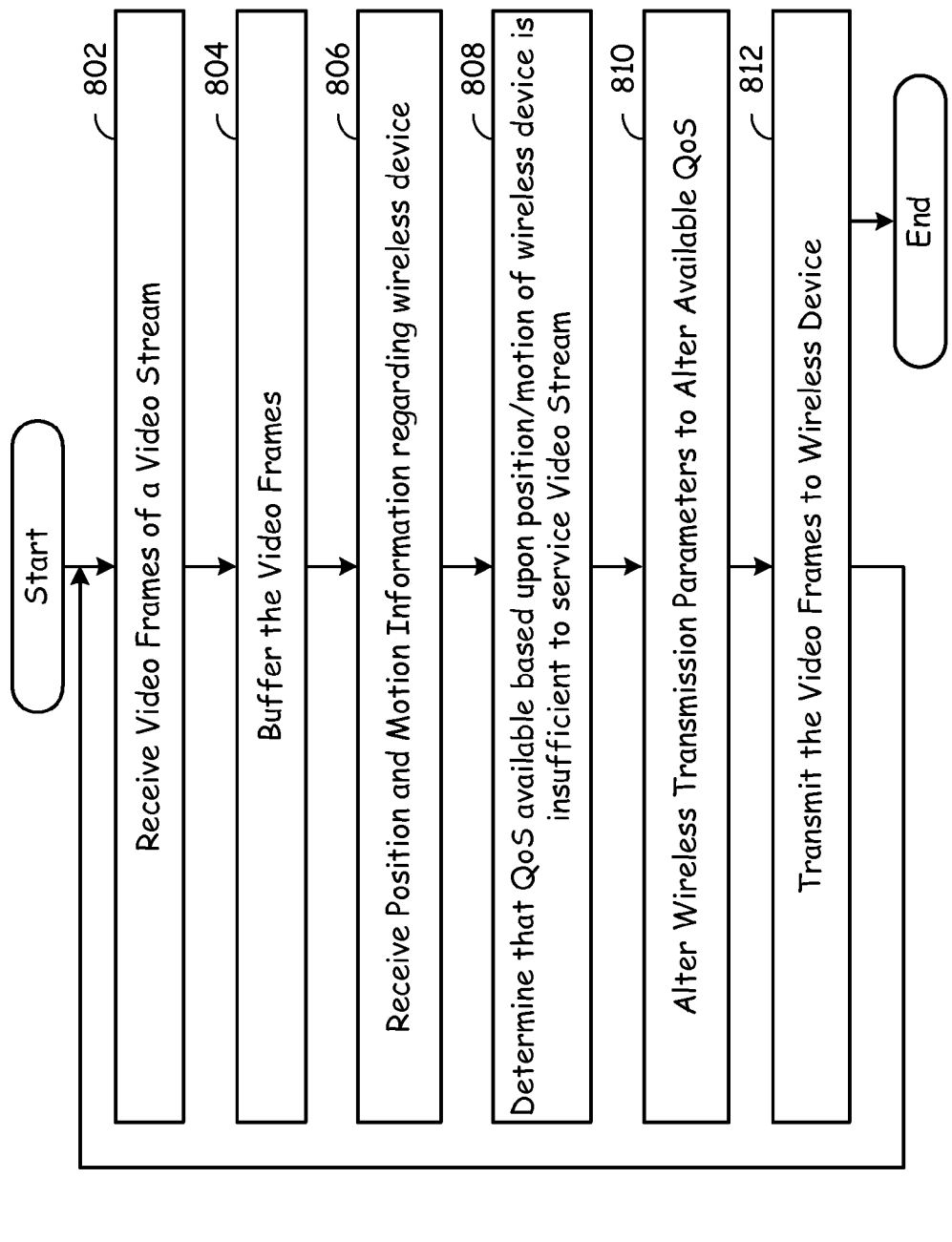
FIG. 8 is a flow chart illustrating operations for altering wireless transmission parameters of a transport path carrying a video stream to a wireless device in response to anticipated QoS based upon location/motion information received from the wireless device according to one or more embodiments of the present invention.

FIG. 8 is a flow chart illustrating operations for altering wireless transmission parameters of a transport path carrying a video stream to a wireless device in response to anticipated QoS based upon location/motion information received from the wireless device according to one or more embodiments of the present invention. The operations 800 of FIG. 8 commence with the video processing system receiving video frames of a video stream (Step 802). The video processing system then buffers the video frames for processing or subsequent transmission to the remote wireless device (Step 804). Then, operations 800 continue with the video processing system receiving position/motion information regarding the remote wireless device to which the video stream will be transported (Step 806).

Then, based upon the position/motion information regarding the wireless device, the video processing system determines that sufficient QoS will not be available using first wireless transmission parameters (Step 808). Then, the video processing system alters wireless transmission parameters to alter the available QoS to service transport of the video stream to the remote wireless device (Step 810). In such case, the wireless transmission parameters that were previously employed to service the video stream or anticipated for servicing the video stream will be altered to second wireless transmission parameters. The second wireless transmission parameters are set or established to a level that is sufficient to service transport of the video stream to the remote wireless device at Step 810. Examples of wireless parameters that are altered at Step 810 will be described further herein with reference to FIG. 9. Then, operation concludes with the video processing system transporting or transmitting the buffered video frames to the wireless device using the second wireless transmission parameters (Step 812).

The operations 800 of FIG. 8 will be employed throughout transport of the video stream by the video processing system to the remote wireless device. Thus, the video processing system receives position/motion information regarding the wireless device at Step 806 to duration of transport of the video stream. Then, the video processing system alters wireless transmission parameters over time in order to service transport of video stream to the remote wireless device at an acceptable QoS. The reader should appreciate that only a single iteration of the Steps 800 of FIG. 8 may be required for delivery of the video stream. The reader should also appreciate that multiple iterations of the Steps 800 of FIG. 8 may be employed during servicing of the video streams by the video processing system.

According to various aspects of the operations of Step 810, the video processing system may initiate handoff of the remote wireless device from one servicing wireless access device to another servicing access device of the same servicing wireless network. Further, the video processing system may initiate handover of the remote wireless device from one servicing wireless network to another servicing wireless network. Moreover, in altering the wireless transmission parameters the video processing system may initiate differing protocol stack layer operations by effectively passing the QoS availability between the protocol layers of the servicing protocol stack.

Figure 9:
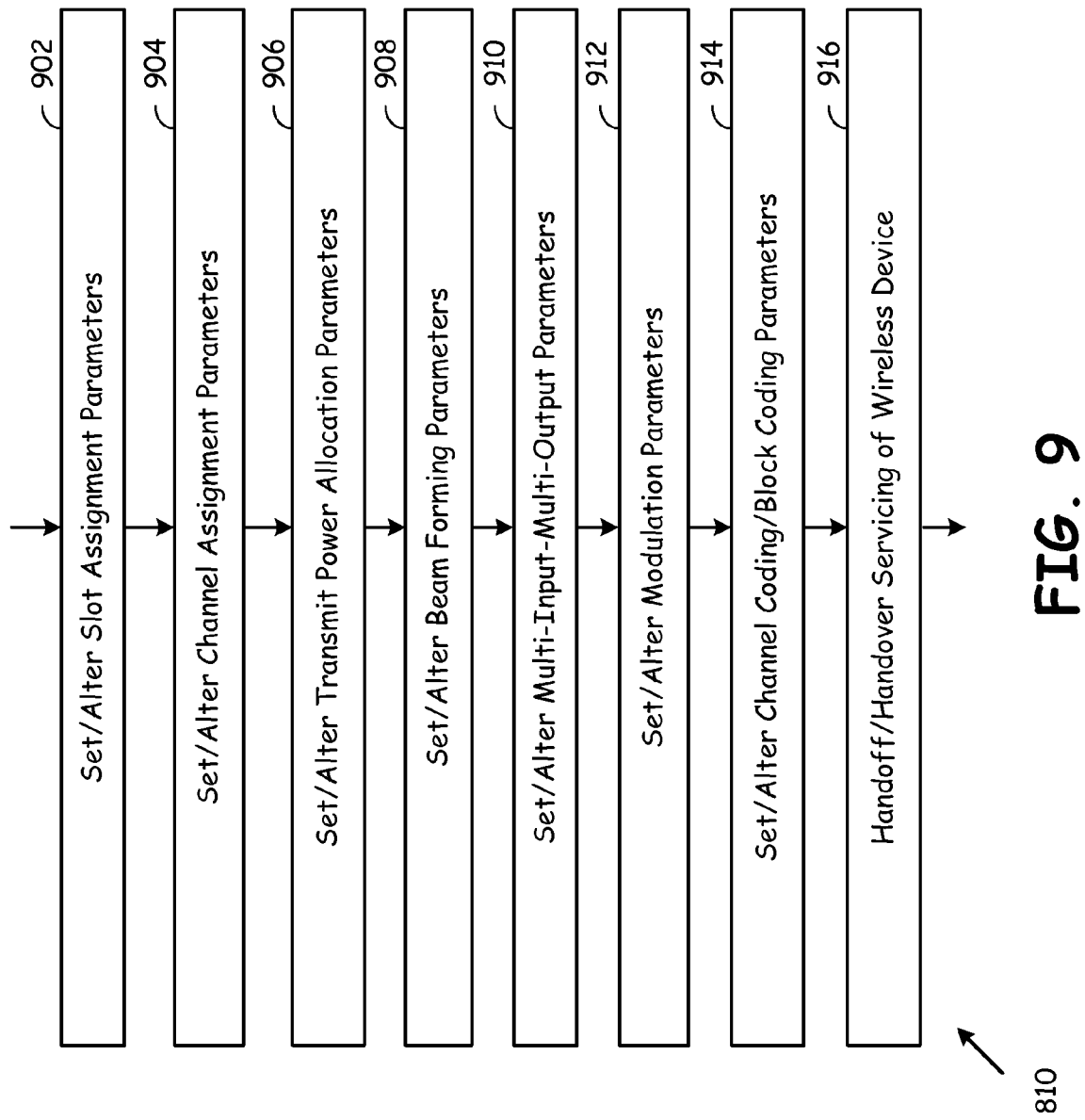
FIG. 9 is a flow chart illustrating operations for establishing/altering wireless link parameter(s) according to one or more embodiments of the present invention.

FIG. 9 is a flow chart illustrating operations for establishing/altering wireless link parameter(s) according to one or more embodiments of the present invention. Referring now to FIG. 9, the various operations of Step 810 of FIG. 8 are described. Some or all of the operations of FIG. 9 are employed when altering or establishing wireless transmission parameters. The reader should understand that these wireless transmission parameters may be singularly or multiply set and altered according to various operations of embodiments of the present invention. According to some of these operations, the wireless transmission parameters may be established or changed by setting or altering slot assignment parameters of the wireless link servicing the remote wireless device (Step 902). Wireless transmission parameters may also be established or changed by setting or altering channel assignment parameters (Step 904), by setting or altering transmit power allocation parameters (Step 906), by setting or altering beam forming parameters (Step 908) and/or by setting or altering Multiple-Input-Multiple-Output (MIMO) parameters (Step 910). The wireless transmission parameters may also be established or modified by setting or altering modulation parameters (Step 912) and/or by setting or altering channel coding/block coding parameters (Step 914). Further, wireless transmission parameters may be altered by handing off a serviced wireless device from a first wireless access device to a second wireless access device (Step 916). Further, at Step 916, the wireless transmission parameters may be altered by handing over servicing of the wireless device from a first servicing network to a second servicing network.

Figure 10:
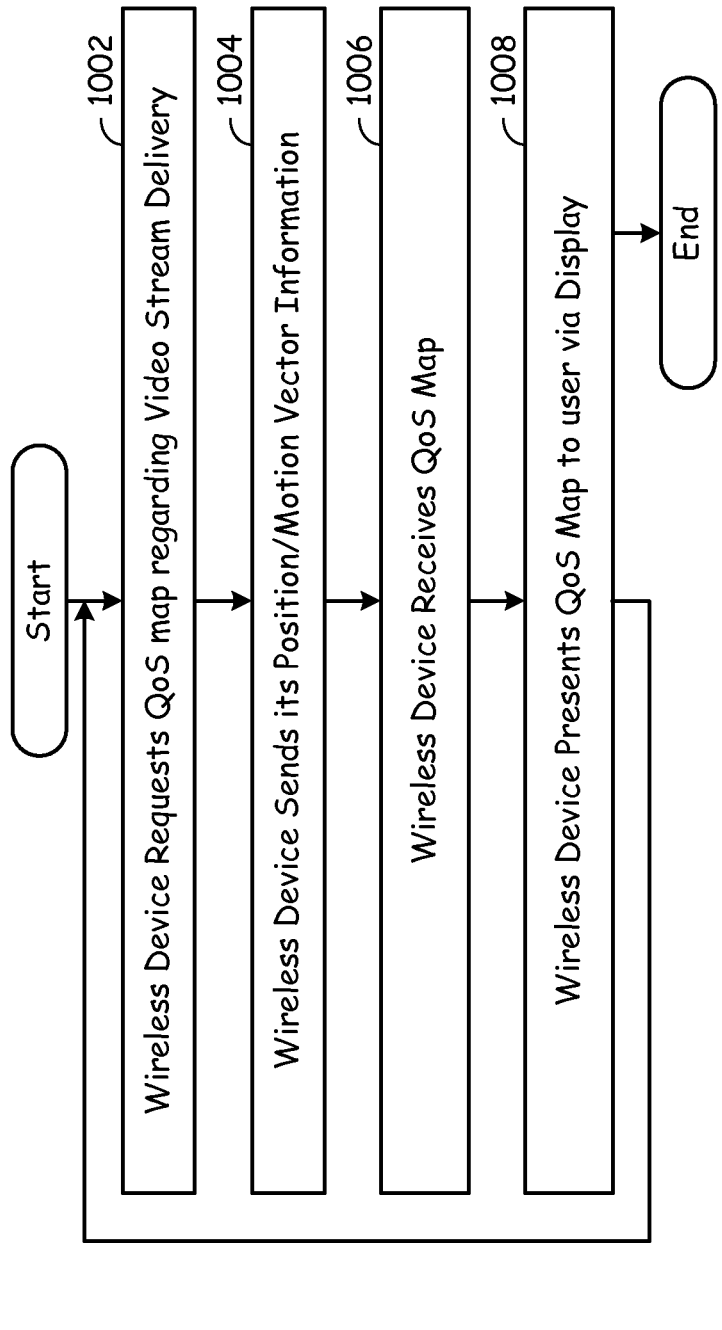
FIG. 10 is a flow chart illustrating operations of a wireless device for receiving and displaying a QoS map relating to video stream delivery according to one or more embodiments of the present invention.

FIG. 10 is a flow chart illustrating operations of a wireless device for receiving and displaying a QoS map relating to video stream delivery according to one or more embodiments of the present invention. The operations 1000 of FIG. 10 commence with a wireless device requesting a QoS map regarding video stream delivery (Step 1002). Such request may be received by a video processing system as was previously described with reference to FIGS. 2 and 5. In response to a query by the video processing system, the wireless device may send its position/motion vector information to the video processing system (Step 1004). The transmission of the position/motion vector information from the remote wireless device video processing system may occur in conjunction with the QoS map request at Step 1002.

In response to its request, the video processing system transmits the QoS map regarding video stream delivery to the remote wireless device (Step 1006). The QoS map will have contained thereon indications of location areas within a service area and, for each indicated location area of the service area, corresponding QoS available for video stream delivery. Finally, the operations 1000 of FIG. 10 include the wireless device displaying or presenting the QoS map to a user via display of the remote wireless device (Step 1008).

The QoS map, as will be further described with reference to FIG. 12, may include QoS information respective to geographic areas identified on the QoS map. Further, the QoS map may indicate to the user the QoS available within a plurality of geographic areas at particular motion levels. For example, the QoS map may indicate to the user of the remote wireless device that a first QoS is available for a stationary wireless device while second QoS is available at a particular mobility of the wireless device. For example, the user of a wireless terminal may receive a lesser QoS when operating the wireless device within a moving car as compared to a stationary use of the wireless device. Further, the QoS map may simply indicate relative QoS qualities available within differing portions of the service area. While the QoS available may not be an absolute number, the relative QoS illustrated will show where a better or worse QoS is available within the service area and potentially within neighboring service areas. For example, as an absolute number, the QoS may indicate a video resolution that is supportable by the wireless device at that location/area/mobility, e.g., 720p, 1080p, etc. Further, the QoS may indicate a frame rate that is supportable by the wireless device at that location/area/mobility. As examples of relative QoS, the QoS map may indicate relative quality levels of streamed video at the various areas/mobility indicated on the QoS map.

Figure 11:
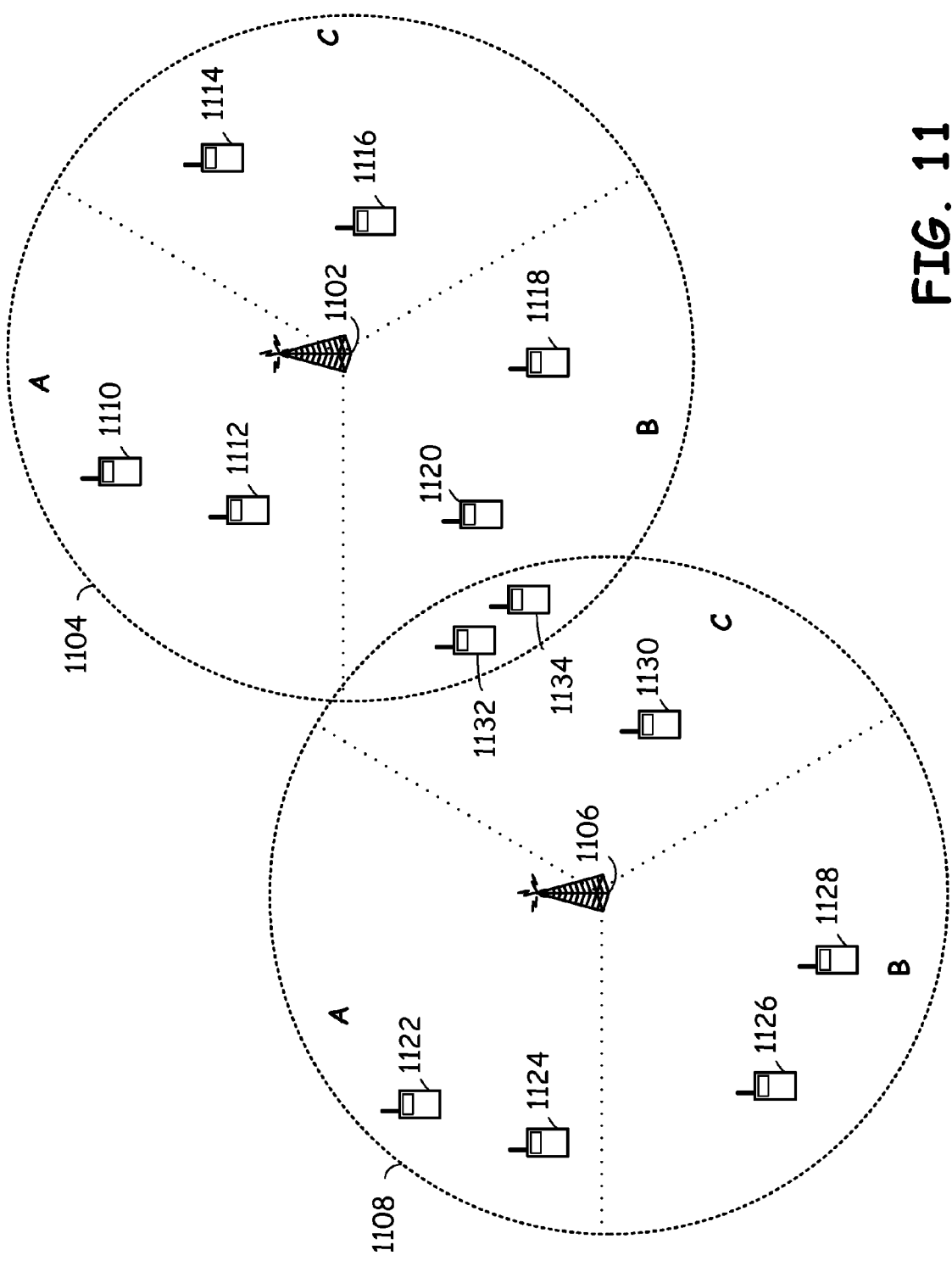
FIG. 11 is a partial wireless network diagram used to described operations for collecting QoS information for a plurality of serviced wireless devices receiving video streams.

FIG. 11 is a partial wireless network diagram used to describe operations for collecting QoS information for a plurality of serviced wireless devices receiving video streams. As shown in FIG. 11, wireless access devices 1102 and 1106 service cells 1104 and 1108, respectively. Cell 1104 is divided into sectors A, B, and C, each serviced by wireless access device 1102. Served within sector A by wireless access device 1102 are wireless devices 1110 and 1112. Wireless access device 1102 serves wireless devices 1114 and 1116 within sector C of cell 1104 and services wireless devices 1120 and 1118 within sector B of cell 1104. Wireless access device 1106 services sectors A, B, and C of cell 1108. Serviced within sector A of cell 1108 are wireless devices 1122 and 1124. Wireless access device 1106 services wireless devices 1126 and 1128 within sector B and services wireless device 1130 within sector C.

As is also shown in FIG. 11, cells 1104 and 1108 overlap at the intersection of sector B of cell 1104 and sector C of cell 1108. Wireless devices 1132 and 1134 are serviced within the intersection of cells 1104 and 1108.

With the collection of QoS information by a video processing system, the video processing system receives location/motion information of the various wireless devices illustrated in FIG. 11 and their particular serviced supported QoS during video stream delivery to the wireless devices. This information is used according to the methodology of FIG. 2 to create a QoS map for the service area of sectors 1104 and 1108. When wireless access devices 1102 and 1106 and their respective service cells 1104 and 1108 are of a common service area, wireless devices 1132 and 1134 may be handed off between the sectors B and C of cells 1104 and 1108, respectively, to alter wireless transmission parameters. When the wireless access devices 1102 and 1106 are of differing service areas, wireless devices 1132 and 1134 may be handed over between the differing service areas cells 1104 and 1108 when altering wireless transmission parameters.

Figure 12:
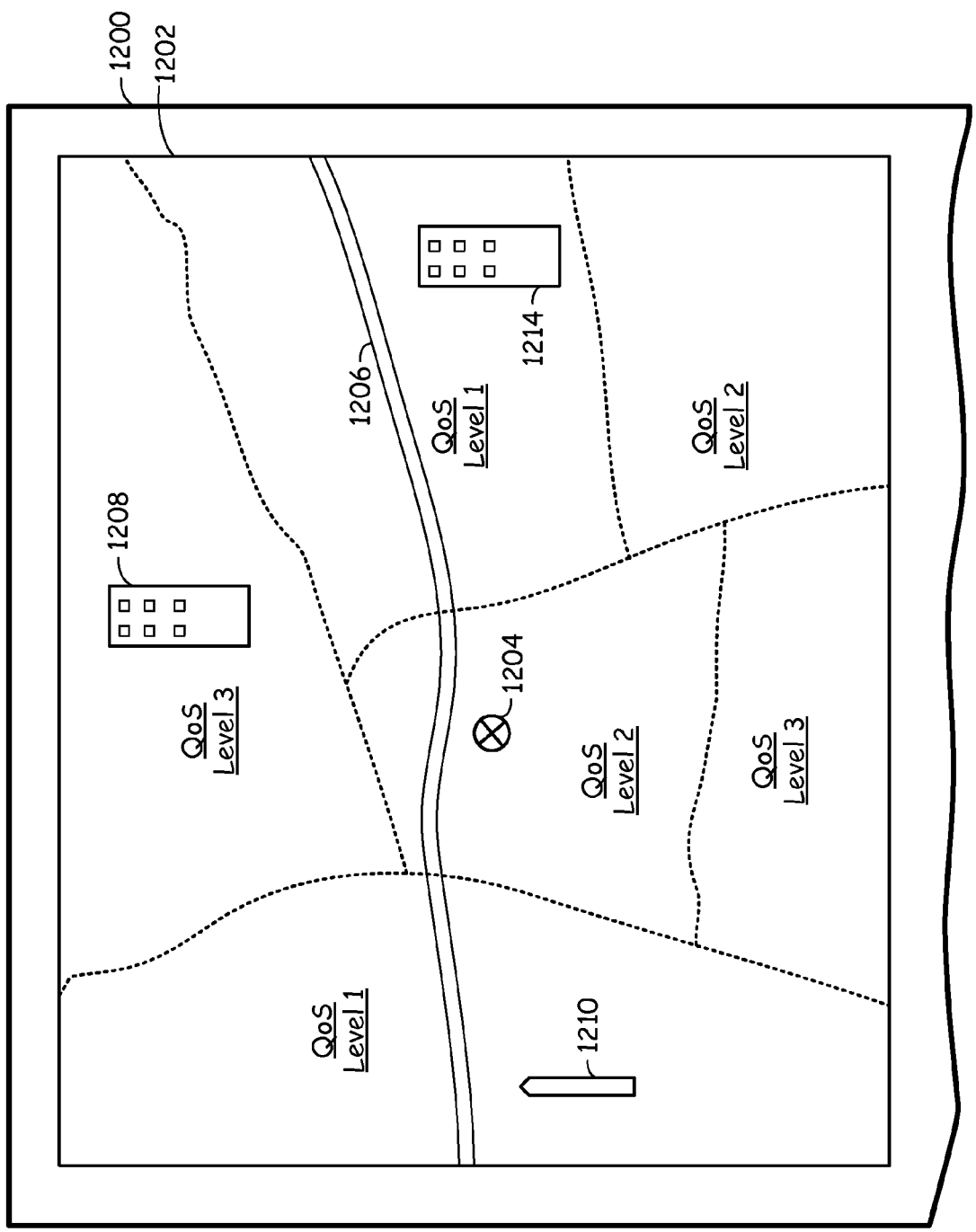
FIG. 12 is a block diagram illustrating a display of a wireless device upon which a video stream delivery QoS map is presented according to one or more embodiments of the present invention.

FIG. 12 is a block diagram illustrating a display of a wireless device upon which a video stream delivery QoS map is presented according to one or more embodiments of the present invention. Referring now to FIG. 12, a display 1202 of a wireless device 1200 as shown and displayed thereupon is a QoS map for a service area within which the wireless device 1200 operates. The QoS map illustrates a current location of the wireless terminal exhibited by a circle/cross 1204. Various dividing lines on the QoS map indicate various QoS levels available within particular portions of the service area identified. For example, the QoS map shows QoS levels 1, 2, and 3. With the example of FIG. 12, QoS level 1 is the highest while QoS level 3 is the lowest. These may be relative QoS levels, absolute QoS levels, or a combination of absolute and relative QoS levels within the service area. Further identified in the QoS map are geographic features such as buildings 1208 and 1214, monument 1210, and road 1206. These particular representations of physical features within the service area illustrated by QoS map provide the user the ability to move within the portion of the service area to reach differing QoS level areas.

The QoS levels may include additional information indicating available QoS based upon mobility of the wireless device. The QoS levels indicated may be based upon a current motion of the wireless device. Alternatively, the QoS levels may be based upon a stationary wireless device. Further, the QoS's illustrated on the QoS map may include differing levels within each a plurality of geographic areas, with each of the QoS levels based upon a particular motion of the wireless device, for example. With the examples of FIG. 12, the wireless device presents the QoS map to the user and the user makes decisions on whether and/or what type of video stream session to initiate. Further, with the examples of FIG. 12, the use may choose to alter the motion of the wireless device or to move the wireless device to another location where the user may initiate a video stream session.

Other information that may be presented via the QoS map is cost information. For example, in some operations, the QoS map may provide cost of service information, e.g., cost per data unit, that would be charged to the wireless device for the servicing of a video stream at a current and/or various other locations within the service area. The cost of servicing the video stream may be a function of the location of the wireless device within the service area. For example, the QoS map may indicate that it is less expensive to service the video stream within lightly loaded portions of the service area. The user of the wireless device may use this cost information in determining whether to and when to initiate a video stream, e.g., a video conference.

Figure 13:
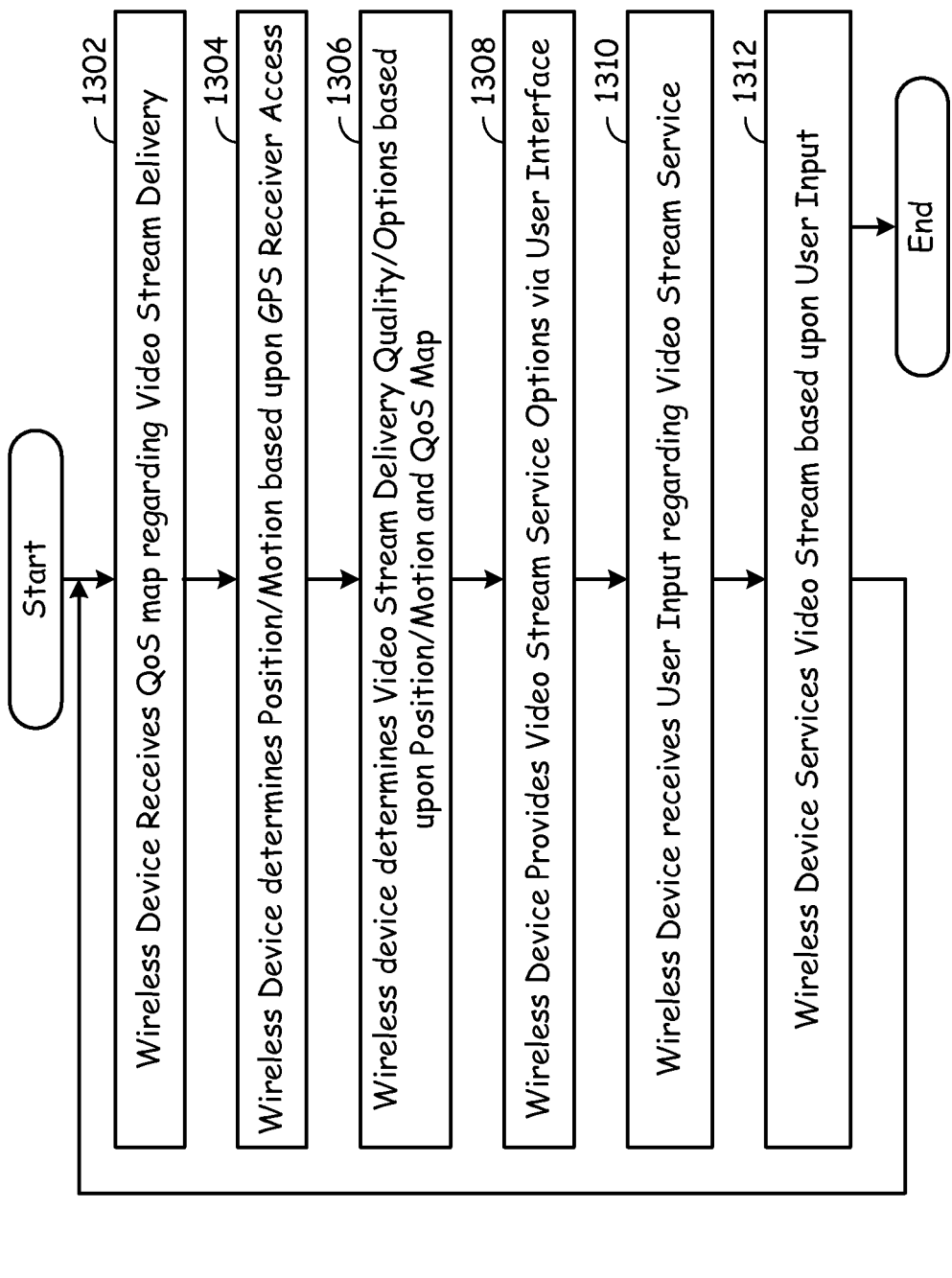
FIG. 13 is a flow chart illustrating operations of a wireless device for receiving and using QoS map information for video stream delivery according to one or more embodiments of the present invention.

FIG. 13 is a flow chart illustrating operations of a wireless device for receiving and using QoS map information for video stream delivery according to one or more embodiments of the present invention. As contrasted to the examples of FIG. 12, with the examples of FIG. 13, the wireless device itself makes some/all decisions regarding whether to initiate a video stream session based upon the QoS map. Thus, in combination, the operations described with reference to FIGS. 12 and 13 describe a range of operations that may be performed using the QoS map received by the wireless device. Based upon the QoS map, the wireless device may simply present the QoS map to the user and allow the user to base decisions upon information presented by the QoS map. In other operations, the wireless device itself makes decisions based upon the QoS map and its current location.

Still referring to FIG. 13, operations 1300 begin with the wireless device receiving a QoS map regarding video stream delivery (Step 1302). The QoS map received may include information that was previously described with reference to FIG. 12 and prior FIGs. The QoS map need not be displayed to the user. The wireless device may simply use the information contained therein without presenting the information to the user of the wireless device. The wireless device then determines its position based upon GPS receiver access (step 1304).

Based upon its position and the QoS map information, the wireless device determines Video Stream Delivery Quality/Options (Step 1306) and provides the video stream service options to a user via the user interface (Step 1308). These options may include, for example, a resolution currently supportable, e.g., 720p, 1080p, etc., a frame currently supportable, or other information that can currently be supported by the wireless device based upon anticipated QoS (gained from the QoS map information). Other options may include, for example, accepting or rejecting a video call, delaying initiation of a video call, or otherwise affecting servicing of a video stream. Other information that may be presented to a user is the cost of servicing the video stream at a current location of the wireless device and/or at other locations of the wireless device. Based upon the video stream service options presented at Step 1308, the wireless device receives user input regarding the video stream service (Step 1310). Examples of such input could be direction to initiate a video conference, to receive a video stream, to enter a wait state wherein the wireless device notifies the user when the wireless device enters a portion of the service area having better QoS, to enter a wait state wherein the wireless device notifies the user when the wireless device enters a portion of the service area having lower cost of service, to simply exit its QoS/location operations, and/or a combination of these operations, for example.

If directed to do so, the wireless device services transmission and/or receipt of a video stream, e.g., servicing a video conference, downloading a video stream movie, uploading a video stream, etc. (Step 1312). The operations 1300 of FIG. 1300 may be performed multiple times. Such multiple iterations of the operations 1300 of FIG. 1300 may be performed during a single video stream session. Alternately, these multiple iterations may occur for differing video stream sessions.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A method for processing video data for delivery to a remote wireless device comprising:
   receiving video data from a video source;
   receiving position and motion information regarding a current location of the remote wireless device;
   based upon the position and motion information regarding the remote wireless device at the current location, determining a Quality of Service (QoS) to be available for servicing of transmissions to the remote wireless device based on a rate of motion of the remote wireless device;
   determining video processing parameters based upon the video data and the QoS for the current location;
   processing the video data based upon the video processing parameters to produce an output video stream for transmission at the current location;
   producing a QoS map for display on the remote wireless device;
   transmitting the output video stream for delivery to the remote wireless device along with the QoS map;
   based upon the current location and rate of motion, anticipating a future location of the remote wireless device; and
   based on the anticipated future location and historical QoS, determining an anticipated QoS for the anticipated future location and transmitting the video stream and the QoS map based on the anticipated QoS when the remote wireless device enters the anticipated future location, so as to transmit the output video stream to the remote wireless device based on changing QoS, as the remote wireless device changes locations, and in which the QoS map to indicate alternative QoS available to the remote wireless device based on different rate of motion of the remote wireless device.

2. The method of claim 1, wherein:
   the video data is an incoming video stream; and
   processing of the video data includes altering a frame rate of the incoming video stream to produce the output video stream.

3. The method of claim 2, wherein altering the frame rate of the incoming video stream to produce the output video stream includes altering Program Clock References (PCRs) of video frames of the incoming video stream to produce video frames of the output video stream.

4. The method of claim 1, wherein:
   the video data is an incoming video stream; and
   processing of the video data to produce the output video stream includes altering a resolution of video frames of the incoming video stream to produce video frames of the output video stream.

5. The method of claim 1, wherein:
   the video data is an incoming video stream; and
   processing of the video data to produce the output video stream includes altering a color resolution of video frames of the video stream to produce video frames of the output video stream.

6. The method of claim 1, wherein:
   the video data is an incoming video stream having color content; and
   processing of the video data includes removing color content of video frames of the incoming video stream to produce video frames of the output video stream.

7. The method of claim 1 further comprising:
   altering the wireless transmission parameters to establish second wireless transmission parameters when sufficient QoS is not available to transmit the output video stream to the remote wireless device.

8. The method of claim 7, wherein the wireless transmission parameters are selected from the group consisting of:
   slot assignment parameters;
   channel assignment parameters;
   transmit power allocation parameters;
   beam forming parameters;
   Multi-Input-Multi-Output (MIMO) parameters;
   modulation parameters; and
   coding parameters.

9. The method of claim 7, wherein altering the wireless transmission parameters to establish second wireless transmission parameters includes handing over servicing of the remote wireless device from a first wireless access device to a second wireless access device.

10. The method of claim 7, wherein altering the wireless transmission parameters includes passing QoS availability between protocol layers of a servicing protocol stack.

11. A video processing system comprising:
a communications interface; and
video processing circuitry coupled to the communications interface that, in conjunction with the communications interface is operable to:
receive video data from a video source;
receive position and motion information regarding a current location of a remote wireless device;
based upon the position and motion information regarding the remote wireless device at the current location, determine a Quality of Service (QoS) to be available for servicing of transmissions to the remote wireless device based on a rate of motion of the remote wireless device;
determine video processing parameters based upon the video data and the QoS for the current location;
process the video data based upon the video processing parameters to produce an output video stream for transmission at the current location;
produce a QoS map for display on the remote wireless device;
transmit the output video stream for delivery to the remote wireless device along with the QoS map;
based upon the current location and rate of motion, anticipate a future location of the remote wireless device; and
based on the anticipated future location and historical QoS, determine an anticipated QoS for the anticipated future location and transmit the video stream and the QoS map based on the anticipated QoS when the remote wireless device enters the anticipated future location, so as to transmit the output video stream to the remote wireless device based on changing QoS, as the remote wireless device changes locations, and in which the QoS map to indicate alternative QoS available to the remote wireless device based on different rate of motion of the remote wireless device.

12. The video processing system of claim 11, wherein:
the video data is an incoming video stream; and
processing of the video data includes altering a frame rate of the incoming video stream to produce the output video stream.

13. The video processing system of claim 12, wherein altering the frame rate of the incoming video stream to produce the output video stream includes altering Program Clock References (PCRs) of video frames of the incoming video stream to produce video frames of the output video stream.

14. The video processing system of claim 11, wherein:
the video data is an incoming video stream; and
processing of the video data to produce the output video stream includes altering a resolution of video frames of the incoming video stream to produce video frames of the output video stream.

15. The video processing system of claim 11, wherein:
the video data is an incoming video stream; and
processing of the video data to produce the output video stream includes altering a color resolution of video frames of the incoming video stream to produce video frames of the output video stream.

16. The video processing system of claim 11, wherein:
the video data is an incoming video stream having color content; and
processing of the video data includes removing color content of video frames of the incoming video stream to produce video frames of the output video stream.

17. The video processing system of claim 11, wherein the video processing circuitry is further operable to:
alter the wireless transmission parameters to establish second wireless transmission parameters when sufficient QoS is not available to transmit the output video stream to the remote wireless device.

18. The video processing system of claim 17, wherein the wireless transmission parameters are selected from the group consisting of:
slot assignment parameters;
channel assignment parameters;
transmit power allocation parameters;
beam forming parameters;
Multi-Input-Multi-Output (MIMO) parameters;
modulation parameters; and
coding parameters.

19. The video processing system of claim 17, wherein the processing circuitry is further operable to alter the wireless transmission parameters to establish second wireless transmission parameters by causing a handing over of servicing of the remote wireless device from a first wireless access device to a second wireless access device.

20. The video processing system of claim 17, wherein the processing circuitry is further operable to initiate a passing of QoS availability between protocol layers of a servicing protocol stack.

* * * * *